United States Patent
Wolleschensky et al.

(10) Patent No.: US 7,612,884 B2
(45) Date of Patent: Nov. 3, 2009

(54) METHOD AND ARRANGEMENT FOR OPTICAL EXAMINATION OR PROCESSING OF A SAMPLE

(75) Inventors: Ralf Wolleschensky, Schoeten (DE); Michael Kempe, Kunitz (DE)

(73) Assignee: Carl Zeiss Jena GmbH, Jena (DE)

( * ) Notice: Subject to any disclaimer, the term of this patent is extended or adjusted under 35 U.S.C. 154(b) by 453 days.

(21) Appl. No.: 10/539,491

(22) PCT Filed: Nov. 29, 2003

(86) PCT No.: PCT/EP03/13476

§ 371 (c)(1), (2), (4) Date: Jun. 17, 2005

(87) PCT Pub. No.: WO2004/057401

PCT Pub. Date: Jul. 8, 2004

(65) Prior Publication Data
US 2006/0152791 A1    Jul. 13, 2006

(30) Foreign Application Priority Data
Dec. 19, 2002 (DE) ................................ 102 59 443

(51) Int. Cl.
*G01N 21/00* (2006.01)
(52) U.S. Cl. ..................................................... 356/432
(58) Field of Classification Search .................. None
See application file for complete search history.

(56) References Cited

U.S. PATENT DOCUMENTS

| | | | |
|---|---|---|---|
| 5,583,342 A * | 12/1996 | Ichie ........................ 250/459.1 |
| 5,648,866 A | 7/1997 | Trebino et al. |
| 5,734,470 A * | 3/1998 | Rogers et al. ............... 356/432 |
| 5,995,281 A | 11/1999 | Simon et al. |
| 6,178,041 B1 * | 1/2001 | Simon ........................ 359/368 |
| 6,269,206 B1 | 7/2001 | Simon et al. |
| 6,462,345 B1 | 10/2002 | Simon et al. |
| 2001/0043403 A1 | 11/2001 | Engelhardt |
| 2004/0174593 A1 | 9/2004 | Weyh et al. |
| 2005/0017160 A1 | 1/2005 | Wolleschensky et al. |

FOREIGN PATENT DOCUMENTS

| | | |
|---|---|---|
| DE | 196 22 359 | 12/1997 |
| DE | 197 44 302 | 4/1999 |

(Continued)

*Primary Examiner*—Michael A Lyons
*Assistant Examiner*—Juan D Valentin
(74) *Attorney, Agent, or Firm*—Reed Smith LLP (57) ABSTRACT

A method and an arrangement for the optical examination and/or processing of a sample comprise an element for generating an illumination light, an element arranged downstream of the latter for spectral splitting of the illumination light for generating spatially separated spectral components, an element for parallelizing the split illumination light, an element for focusing the illumination light on or in the sample, wherein the spectral components are superposed, and an element for detecting the sample light, advantageously comprising an element for generating a short-pulse illumination light, an element arranged downstream of the latter for spectral splitting of the illumination light for generating spatially separated spectral components with pulse lengths that are greater than the pulse length of the illumination light, wherein these spectral components are combined again in the sample.

36 Claims, 11 Drawing Sheets

FOREIGN PATENT DOCUMENTS

| | | |
|---|---|---|
| DE | 198 27 139 | 4/1999 |
| DE | 198 29 981 | 1/2000 |
| DE | 198 35 072 | 2/2000 |
| DE | 199 30 532 | 1/2001 |
| EP | 1 143 282 | 10/2001 |
| SU | 1439519 | 11/1988 |

* cited by examiner

METHOD AND ARRANGEMENT FOR OPTICAL EXAMINATION OR PROCESSING OF A SAMPLE

CROSS REFERENCE TO RELATED APPLICATIONS

This application claims priority of International Application No. PCT/EP2003/013476, filed Nov. 29, 2003, and German Application No. 102 59 443.0, filed Dec. 19, 2002, the complete disclosures of which are hereby incorporated by reference.

BACKGROUND OF THE INVENTION a) Field of the Invention

The invention is related to a method and an arrangement for optical examination for processing of a sample.

b) Description of the Related Art

At the present time, nonlinear contrasts such as multiphoton absorption or second harmonic generation (SHG) are used increasingly in microscopy, e.g., for examining biological specimens. Short-pulse lasers are advantageously used in order to provide the energy necessary for exciting nonlinear effects. For this purpose, the pulse peak output should be as high as possible and, therefore, the pulse length at the location of the sample should be as small as possible in order to prevent the specimen from being damaged at the same time. Short-pulse lasers deliver light pulses, for example, with a pulse length of some tens of femtoseconds at a repetition rate of some tens of megahertz. Accordingly, they have the advantage of emitting extremely high pulse peak energies with low average output at the same time.

It is disadvantageous that the short pulses change over the path through the microscope to the sample due to group velocity dispersion (GVD); normally, they become longer.

Corresponding arrangements have been proposed to compensate pulse lengthening (DE 19827139A1, DE19744302A1, DE19930532A1).

The described devices are suitable substantially only to compensate second-order dispersion. Therefore, they are not adequate in case higher-order dispersions occur, i.e., pulse lengthening cannot then be compensated completely. However, higher-order dispersions that cannot be determined beforehand must be taken into account, for example, in biological specimens. Further, higher-order dispersions occur in the optical components in a microscope. Accordingly, it is not possible to create optimal conditions for exciting nonlinear contrasts using the conventional techniques.

Another disadvantage consists in that the samples can be damaged by the high pulse peak outputs or pulse peak intensities outside the area in which sample interaction is desired, or the optics of the microscope arrangement can be damaged.

In conventional fluorescence microscopy, different dyes are used for specific marking of biological specimens. These dyes are subsequently excited by different light wavelengths. In specimens of this kind, a simultaneous excitation of the different dyes is usually carried out through the use of multiphoton excitation. This is advantageous on the one hand, since only one light wavelength is needed for excitation. On the other hand, it is disadvantageous when the emission wavelength bands of the individual dyes overlap because the dyes can then no longer be separated spectrally.

OBJECT AND SUMMARY OF THE INVENTION

The primary object of the invention is to eliminate these disadvantages of the related art. In accordance with the invention, a method for the optical examination and/or processing of a sample comprises the steps of generating a short-pulse illumination light; splitting the illumination light spectrally for generating spatially separated spectral components with pulse lengths that are greater than the pulse length of the illumination light source, the spectral components traversing transmission optics in the direction of the sample; focusing the illumination light on or in the sample, wherein the spectral components are superposed; and detecting the sample light.

Arrangements in accordance with the invention are also encompassed by this application.

In an advantageous manner, the invention makes it possible to vary the amplitude modulation and/or phase modulation of the light pulses in a Fourier plane by means of a feedback process in such a way that a corresponding measurement quantity (e.g., the two-photon fluorescence signal) is optimized in a microscope. Further, the arrangements according to the invention make it possible to achieve high pulse peak outputs at the location of the sample without causing damaging effects in the microscope arrangement or in layers outside the focal area in which the measurement quantity is to be excited. The beam cross section can also be adapted in a variable manner by the arrangement for optimal filling of the optics focusing in the sample.

BRIEF DESCRIPTION OF THE DRAWINGS

In the drawings:

FIG. 11 shows arrangements schematically of the construction of elements D1 and D2 shown in FIGS. 3 to 6.

DESCRIPTION OF THE PREFERRED EMBODIMENTS

Figure 1:
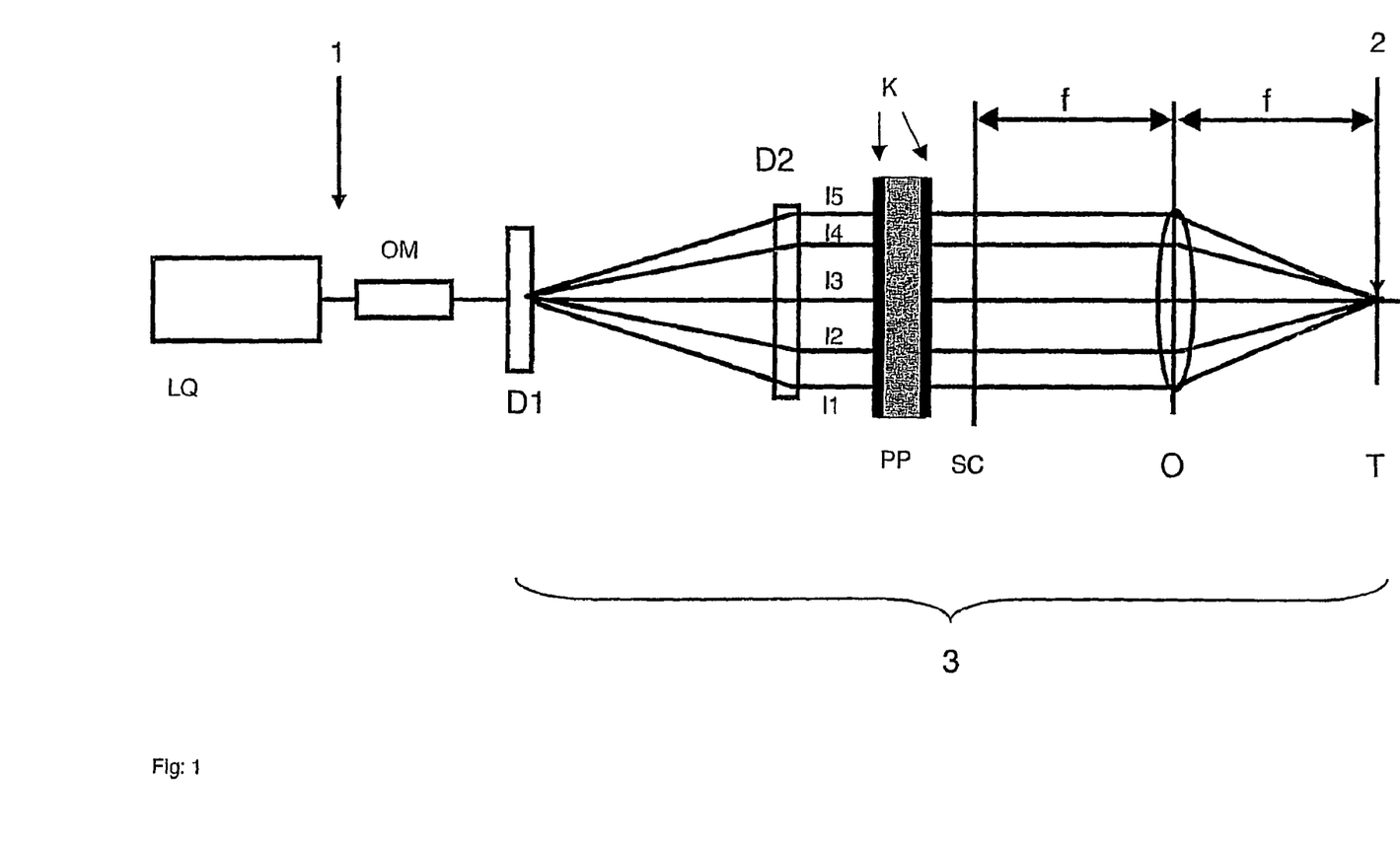
FIG. 1 shows the principle of the invention in schematic form.

FIG. 1 shows the basic principle of the invention schematically. A short-pulse light source LQ emits coherent (short-pulse laser) or temporally incoherent light (broadband or white-light source) which arrives at a first dispersive element D1, e.g., a prism or grating, advantageously in a collimated manner. The dispersive element splits the arriving beam spectrally around its center wavelength so that the spectral components, designated by 11-15, of every light pulse are spatially separated.

A second dispersive element D2 has a substantially identical characteristic with respect to spectral splitting, but is arranged so as to be spatially opposite to the first element D1. Accordingly, the light travels in a parallel (collimated) manner again, but is still spectrally split spatially and traverses an arrangement for optical scanning of a sample T (FIG. 1) which is indicated only schematically in this instance by an X/Y scanner SC and an objective lens O. The scanners X/Y are in the vicinity of the rear pupil of the objective O. This is indicated schematically by the designation of the focal length f of the objective.

The beam is bundled again in direction of the sample T by means of the objective. This means that the spectral splitting is canceled again in the focus of the objective O and the light pulse of the light source LQ is accordingly reconstructed.

Therefore, there are no short pulses between the element D1 and the object T because the spectral components do not overlap spatially. The length of the light pulses in the area between D1 and O depends on the spatially spectral resolution of the splitting of the light pulses.

An advantage of an arrangement of the kind described above consists in that the optics traversed by the light pulses, at least in area 3, need not be protected from damage by very short pulses or by very high pulse peak outputs. The high pulse peak outputs first occur directly at the point of the sample interaction, i.e., in the focal area in which, for example, a nonlinear sample interaction (e.g., two-photon fluorescence excitation) with a dye is also carried out. In this way, the samples are protected from damage at least outside the area in which the sample interaction is to be carried out. On the other hand, the correction of the optical arrangement for imaging in the sample can be improved because there is a wider range of usable materials and optical layers, which also makes it possible to cut costs.

A further advantage consists in that means for influencing the light pulses spatially in different ways, e.g., phase plates PP, can be added in the collimated beam path, for example, in front of the scanner SC. The phase plates have different thicknesses along their cross section in certain areas in order to change the optical index of refraction so that determined spectral components are delayed in time with respect to other spectral components. In this way, the group velocity dispersion GVD of the optics can be compensated in the entire beam path from the light source LQ to the sample T, including additional glass materials OM.

The light pulses can be influenced with respect to their shape by using a plurality of differently shaped phase plates of the type mentioned above. The adjustment of the phases of the spatially separated portions relative to one another can also be carried out flexibly, for example, by a spatial light modulator SLM which has individually controllable elements (advantageously in matrix form) and which is arranged, instead or in addition, in the vicinity of PP in the beam path.

Another advantage is that the elements D1 and D2 can be used for variable beam expansion. For this purpose, the distance between elements D1 and D2 is changed resulting in a beam expansion depending on the distance between the elements (see also FIGS. 3a, 4a, 6a—S1 and S2) depending on the construction of the elements D1 and D2 in at least one spatial direction.

At least one additional light source, e.g., for parallel detection of the reflection light of the sample by means of additional detectors, described in the following, can be coupled in by means of a beam splitter, preferably in the parallel beam path, advantageously between D2 and scanner SC.

Figure 2:
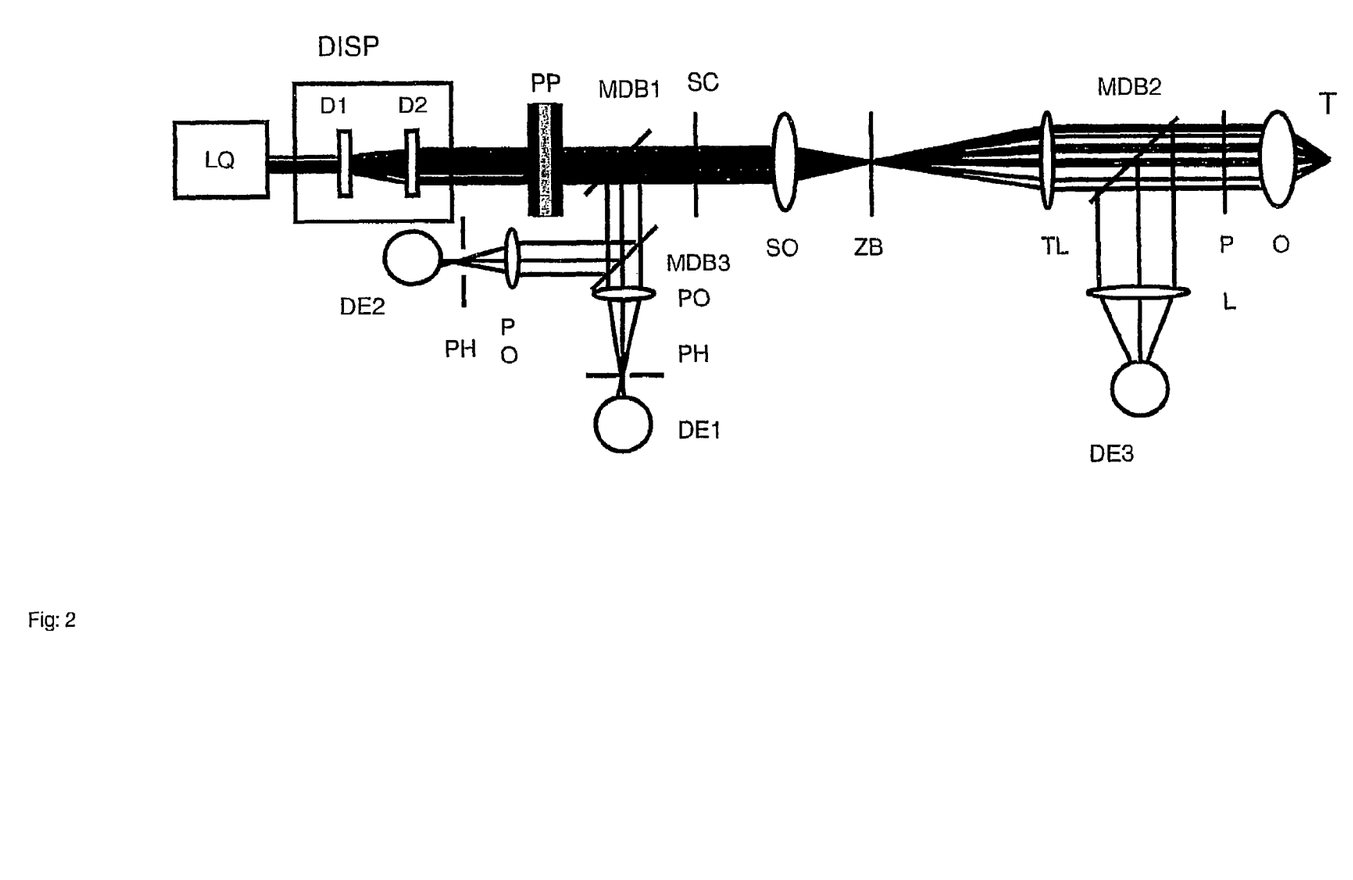
FIG. 2 shows an arrangement in accordance with the invention such as that in a laser scanning microscope.

FIG. 2 shows an arrangement such as that in a laser scanning microscope, with pinhole optics PO, pinhole PH, detectors DE1 and DE2, and a first dichroic beam splitter (main color splitter), MDB 1 for coupling out the detection light from the illumination beam path after scanners SC (descanned detection), scanning optics SO, an intermediate image ZB, a tube lens, and another detection beam path for nondescanned detection DE3. The nondescanned detection light is reflected out in this case by means of another dichroic beam splitter MDB2. The additional splitting of the detection light into a plurality of detection channels can be carried out by using another dichroic beam splitter, for example, for two channels DE1 and DE2 with MDB3. Corresponding filters are advantageously swiveled in between the MDB and the DE in front of the detectors for measuring a fluorescence signal.

In this case, P is the pupil of the microscope objective O. The scanner SC for scanning the sample is located in another pupil plane of the microscope arrangement conjugate to this plane.

The unit for the spectrally spatial splitting of the spectral components of the light source DISP comprises the elements D1 and D2 which were already described above. They are located in the collimated beam path, advantageously between the light source and the MDB1, and, in addition to the spectrally spatial splitting of the spectral components of the light pulses, also cause a beam expansion of the light source for optimally filling the pupil P. Generally, the unit DISP acts in addition as a prechirp unit, i.e., it can be used to compensate for at least a portion of the GVD of the microscope optics. The adjustability of the compensation is illustrated with reference to FIG. 11.

A compensation of the remaining GVD can be carried out by means of the phase plate PP (see also above) in the collimated beam path, e.g., in front of the scanner SC, which phase plate PP has different thicknesses over its cross section, e.g., a curvature of at least one side surface of the plate, or of both side surfaces, or a wedge shape.

The curvature is adjusted in such a way that the remaining GVD of the optics in the beam path from the light source LQ to the sample T is compensated and therefore broadband-limited pulse lengths occur due to the time delay of individual spectral components of the light pulses, i.e., the shortest possible pulse lengths, at the location of the sample.

The pulse can be further influenced with respect to its shape by using a plurality of phase plates of the type mentioned above with different curvatures. This influence is necessary in a microscope because of the effect of the following factors, as a result of which the pulse length is usually no longer broadband-limited by the influence at the location of the sample, i.e., longer pulses occur. These factors are:

The glass materials from which the optical elements in the microscope are manufactured. In this case, compensation can be carried out in a stationary manner.

The specimen itself. In this case, the pulse lengthening is dependent upon the depth of penetration into the specimen. Further, the pulse enlargement is generated by higher-order dispersions. Therefore, in this case, the compensation must be carried out for every spectral component individually and in real time.

The change in wavelength.

The change in the average output in case additional nonlinear processes such as self-phase modulation occur in glass fibers.

Therefore, the use of SLM is particularly advantageous and the adjustment of the phases of the spatially separate portions relative to one another can be carried out, as was described above, in a flexible manner through individually controllable elements (advantageously in matrix form). The elements are controlled depending on the quantities mentioned above by advantageously regulating in real time, wherein a two-photon fluorescence signal that is excited in the sample T functions as a measurement quantity, for example. In most cases, optimization of the pulse length is achieved at the point of sample interaction by appropriate regulation.

Further, the interaction cross sections of the dyes that are used depend on the temporal behavior of the light pulses. Therefore, it is possible to optimize the fluorescence signal for individual dyes while the fluorescence of other dyes is suppressed at the same time. Accordingly, by feeding back the measurement quantity (in this case, the two-photon fluorescence signal), it is possible to adjust the temporal behavior of the light pulses by means of phase modulation or amplitude modulation in such a way that the corresponding measurement quantity is optimized.

Figure 3:
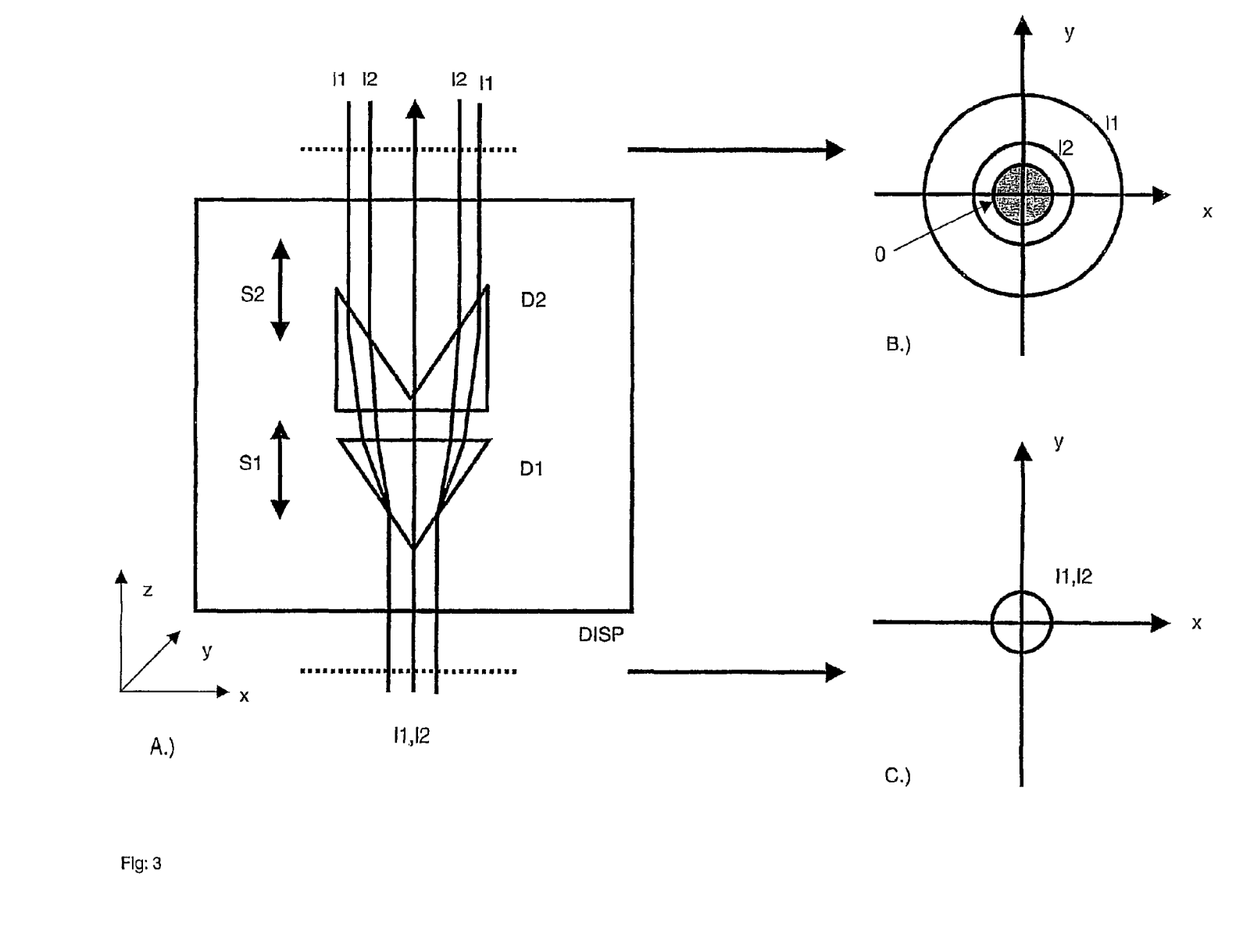
FIG. 3 shows two axicons, A1, A2, wherein A1 is illuminated, for example, proceeding from the tip.
Figure 4:
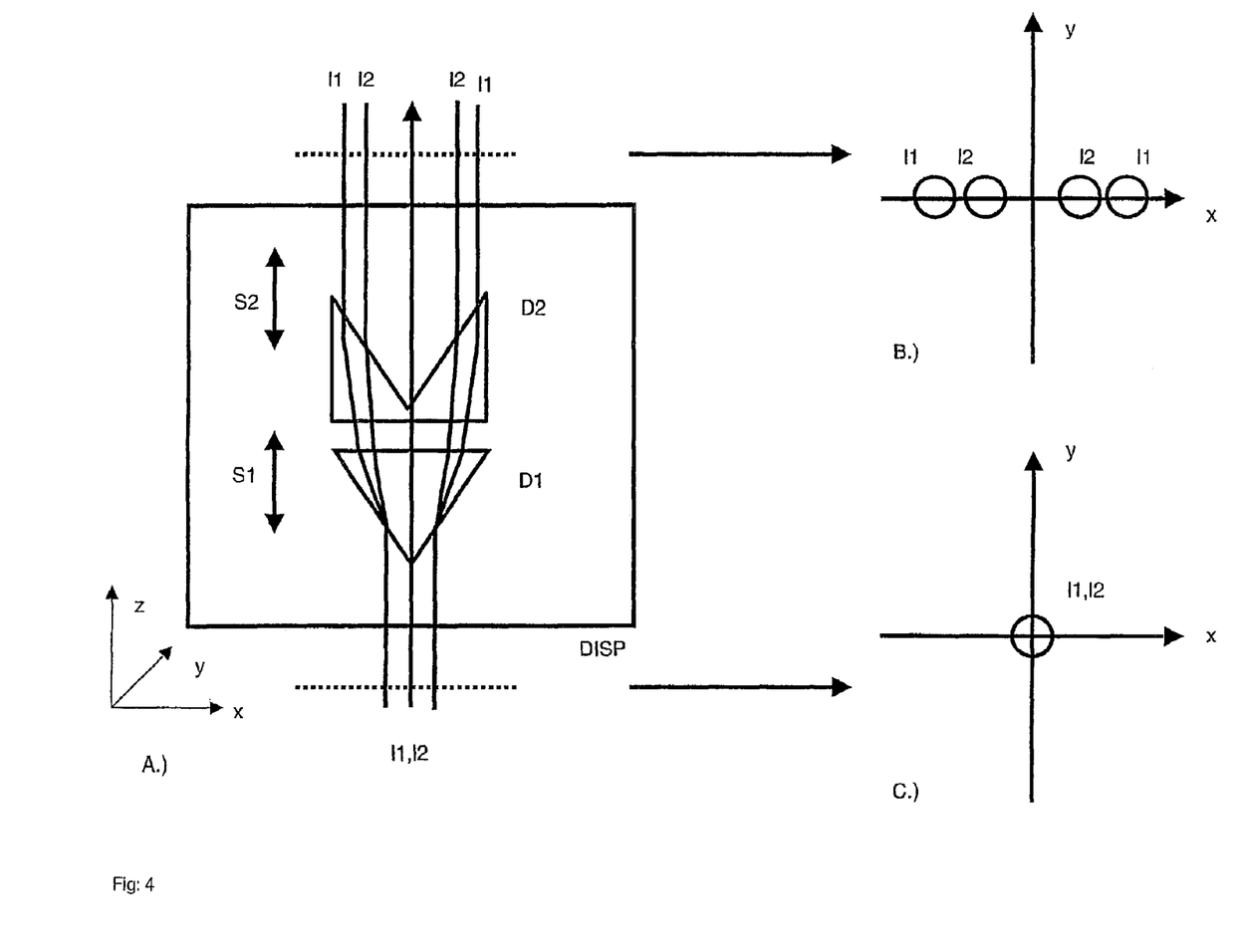
FIG. 4 illustrates, in schematic representation, an arrangement with two prisms, P1, P2, in which P1, for example, is illuminated proceeding from the tip.

Arrangements for the unit for spectrally spatial splitting of the spectral components of the light source DISP, i.e., for D1 and D2, are described by way of example in FIGS. 3a and 4a. FIG. 3 shows two axicons A1, A2, wherein A1 is illuminated, for example, proceeding from the tip. The axicons are arranged and constructed in such way that the first axicon introduces an angular dispersion which is compensated again by the second axicon, so that a parallel beam occurs again after the second axicon in the beam direction.

This means, preferably, that D2 is constructed in such a way that it has a plane plate effect in combination with D1. Specifically, this means that D1 has a plane plate with a prismatic or axicon-shaped recess into which D2 fits (in theory) and forms a plane plate with D1.

The axicons can comprise prism-ground glass plates (refractive elements) or, to increase the angular dispersion, diffractive elements, e.g., annular grating structures. For a definition of the axicon, reference is had in particular to http://www.sciner.com/Opticsland/axicon.htm.

FIG. 4 shows an arrangement with two prisms P1, P2 in which P1, for example, is illuminated proceeding from the tip. The arrangement is constructed in such a way that the first prism again introduces an angular dispersion that is compensated by the second prism so that a parallel beam results again after the second prism in the beam direction. With respect to construction, reference is had to the remarks pertaining to FIG. 3.

FIGS. 3b, 4b show the beam distribution before the first element and FIGS. 3c, 4c show the beam distribution after the second element.

When prisms are used, the split spectral components 11, 12 . . . are next to one another in a line and, when axicons are used, lie in a plurality of planes in a ring shape, every spectral component filling up a determined ring.

Arrows S1, S2 indicate a movement of the two dispersive elements relative to one another or away from one another which is controlled, possibly also coupled, by means of a control unit, not shown. Apart from the adaptation of the beam expansion which was described above, this displacement also causes a change in the pulse length at the location of the sample T (see, e.g., DE 19744302A1, DE19930532A1, without cancellation of the spatial separation).

According to the invention, the described adjustment of the pulse shape can also be carried out in combination with other control functions of the microscope, for example, for changing the spectral composition of the illumination and/or of the intensity (DE19829981A1) during the image recording for determined sample areas. Control is carried out by means of the central control unit of the microscope.

In case of a change in the center wavelength of the light source, a pre-stored readjustment of the elements D1 and D2 relative to one another can be carried out.

Figure 5:
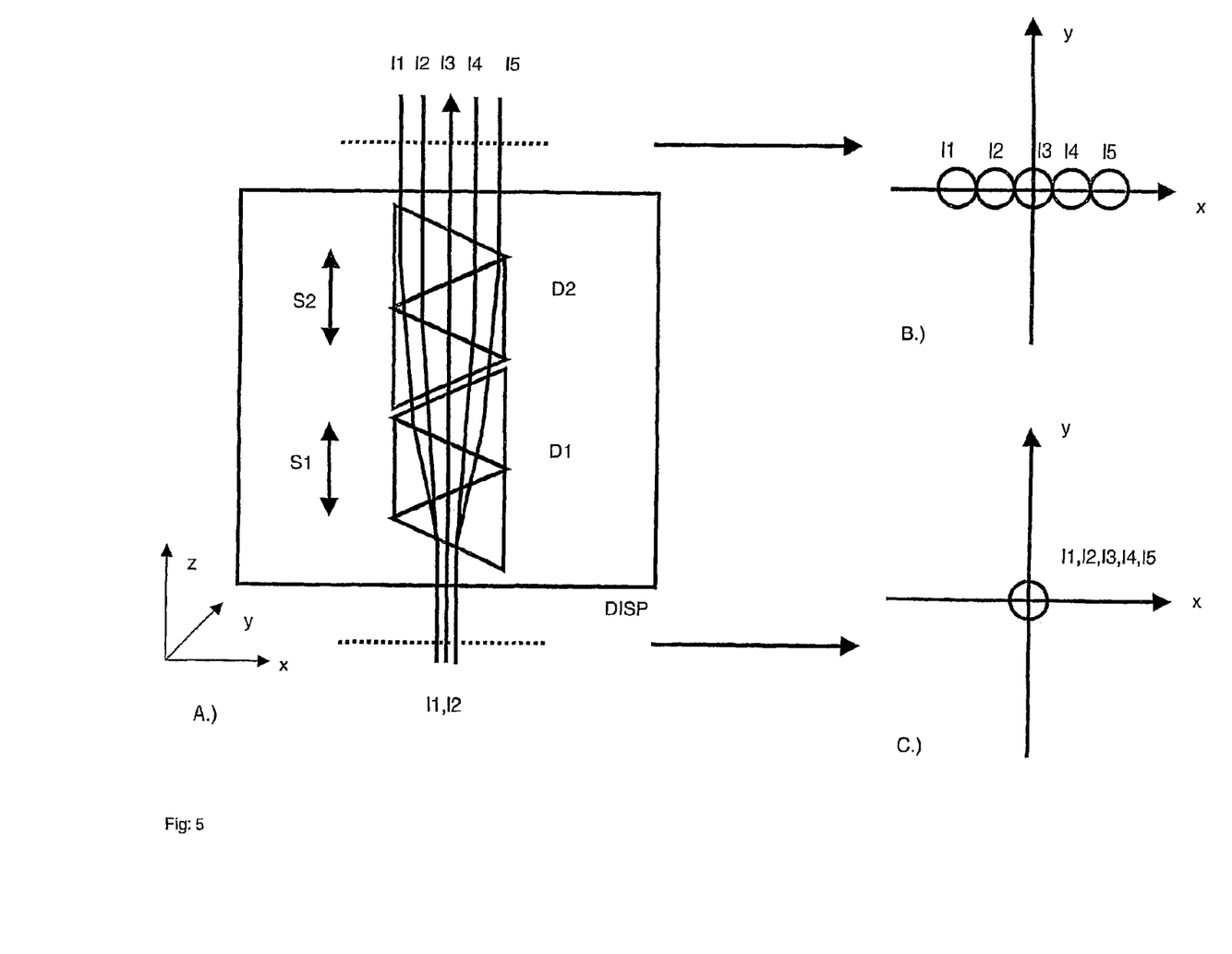
FIG. 5 illustrates, in schematic representation, another construction of the unit DISP with direct-vision prisms GP, also called Amici prisms.

FIG. 5 shows another construction of the unit DISP with direct-vision prisms GP, also called Amici prisms. The direct-vision prism generates a fixed, nonadjustable spatial splitting of the spectral components of the light source and, therefore, also a fixed beam expansion. The spectral components of the light pulses are subsequently oriented in a spatially parallel manner again.

It is advantageous in this arrangement of the DISP that a high transmission and a mechanically stable construction can be realized in a particularly simple manner.

Figure 6:
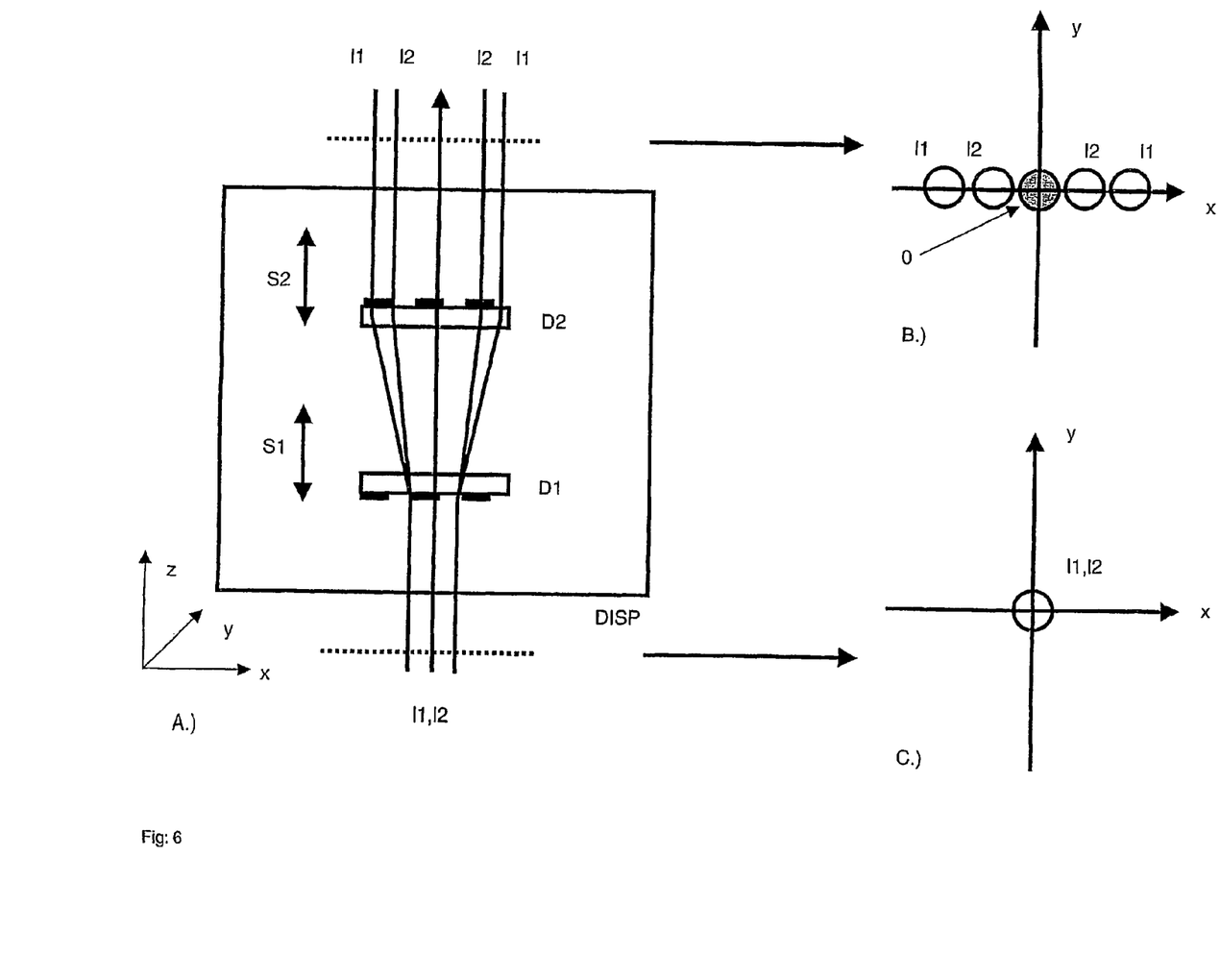
FIG. 6 illustrates, in schematic representation, another arrangement with transmission gratings.

FIG. 6 shows another arrangement with two transmission gratings. The beam shape is substantially equivalent to the arrangement in FIG. 4. However, the angular dispersion can be increased by using the grating. When gratings are used, there results, in addition, the zeroth-order diffraction of the grating on the optical axis, designated by 0 in the drawings.

The first-order diffraction following the first transmission grating passes into the negative-order diffraction of the second grating. The angular dispersion is accordingly canceled, but the beams remain spatially separated.

In addition to the arrangements shown in FIGS. 3 to 6 showing examples of the construction of elements D1 and D2, it is also possible in principle (see also DE 19744302A1) to use reflecting elements such as reflection gratings or elements that also introduce a deflection in addition to the angular dispersion (e.g., dispersion prisms in drawing part A or reflection gratings in drawing part B).

FIG. 11 shows arrangements of the type mentioned above schematically. In these arrangements, when there is a change in the center wavelength it is necessary not only that the dispersive elements D1 and D2 themselves are moved relative to one another, but also either the beam path from the light source LQ up to and including D1 or D2 up to and including the sample T. The movement B is carried out as indicated by arrows; in this case, it is perpendicular to the optical axis that is formed proceeding from the light source.

Figure 7:
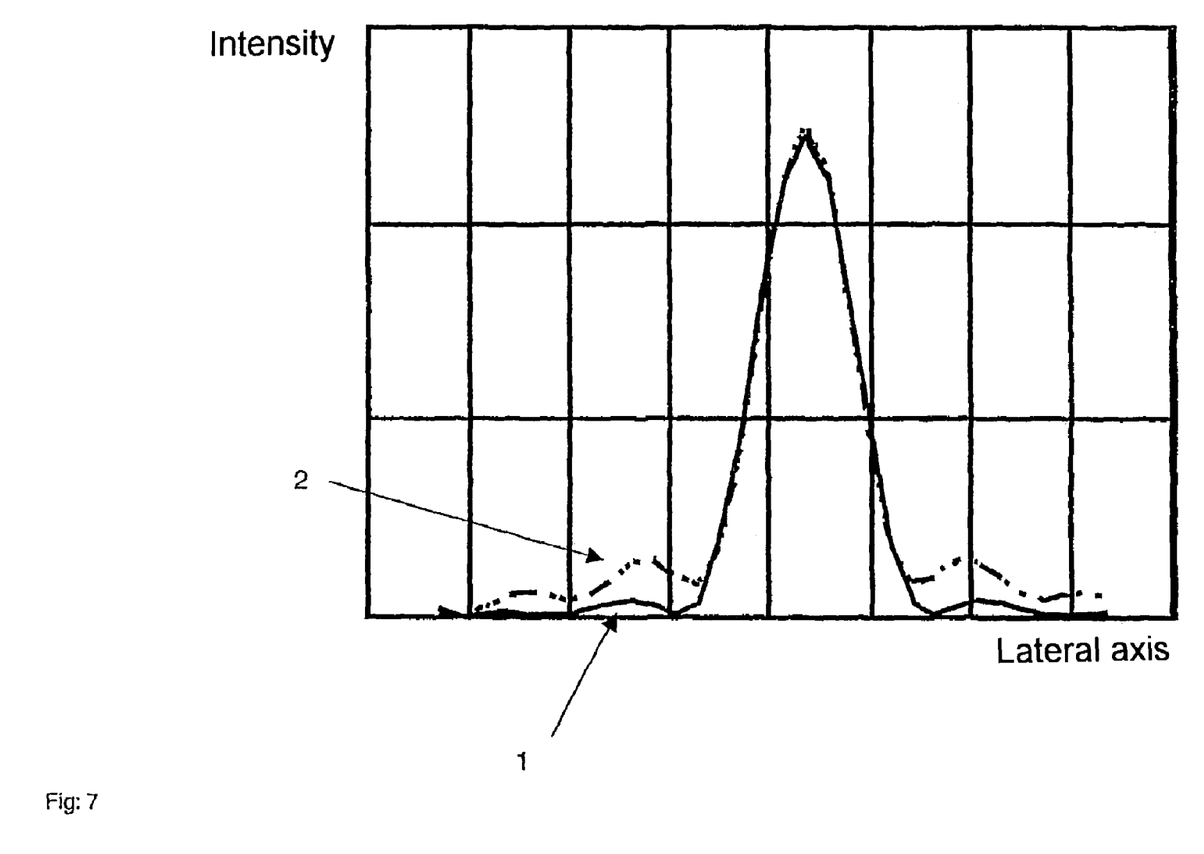
FIG. 7 is a graphical representation with the lateral intensity distribution in the focus, i.e., at the location of the sample T, scaled to one.

The lateral intensity distribution in the focus, i.e., at the location of the sample T, is shown in FIG. 7 scaled to one. The reference distribution (1) for an illumination according to the prior art is shown; all spectral components of the light source simultaneously illuminate the pupil of the optics focusing in the sample.

The intensity distribution for an illumination of the pupil with an arrangement according to the invention in FIG. 3 is shown (2) for the sake of comparison. It will be noted that there is only a negligible deviation of the curve (2) from the reference curve (1) and a comparable optical resolution can accordingly be achieved particularly in multiphoton microscopy.

Figure 8:
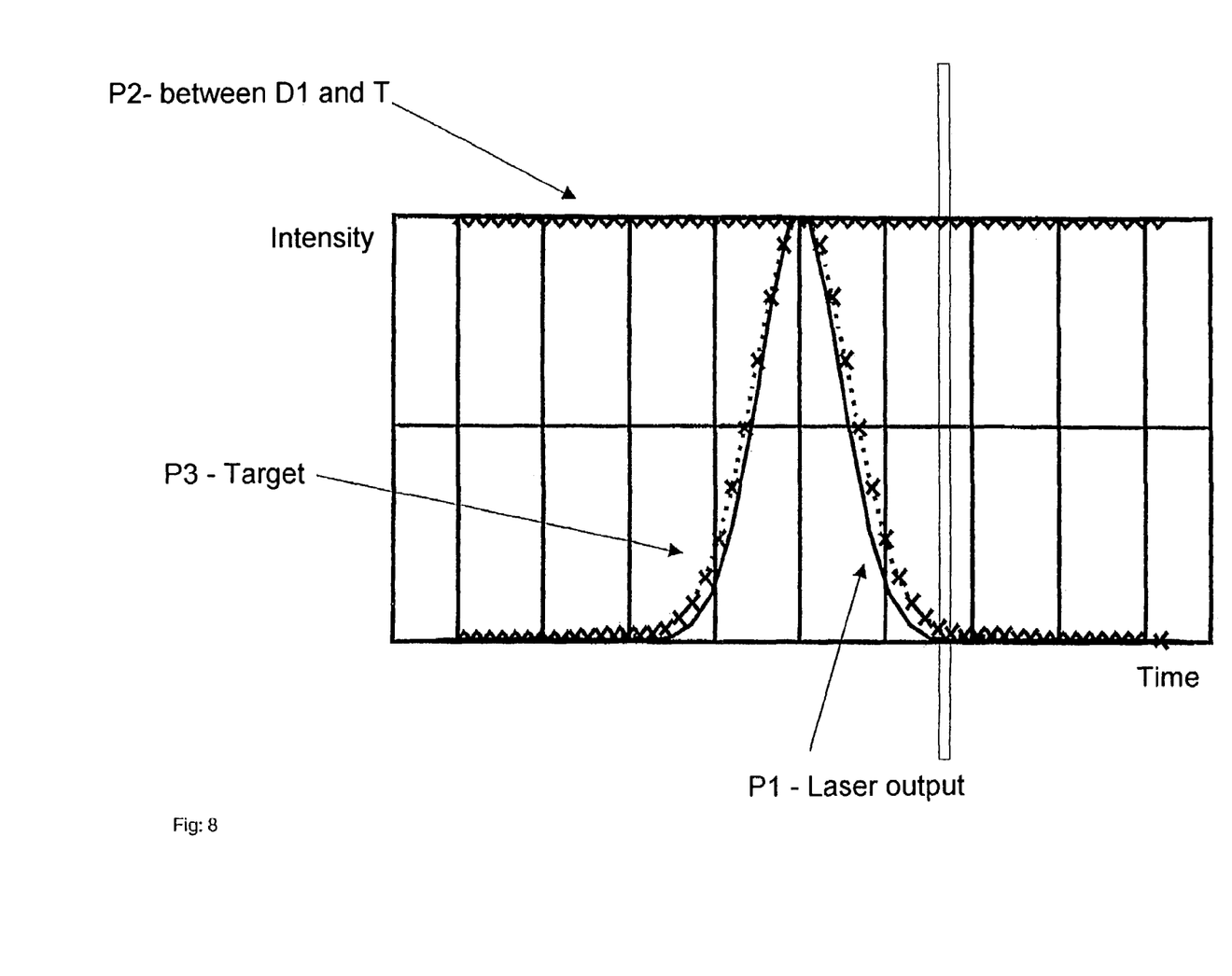
FIG. 8 is a graphical representation showing the intensity distribution scaled to one in the focus and on the optical axis as a function of time.

FIG. 8 shows the intensity distribution scaled to one in the focus and on the optical axis as a function of time (pulse distribution), e.g., for the construction of elements D1 and D2 according to FIG. 3. P1 shows the pulse distribution at the laser output. P2 is the pulse length between the dispersive element D1 and the sample T. In the curve, P3 is the pulse distribution at the location of the sample T. It will be seen that between element D1 and the sample T there is a laser intensity which is virtually constant (in the time window shown in the drawing) with a subsequently low peak intensity. Accordingly, the pulse peak outputs are low in this area. However, at the location of the sample, i.e., after the spatial superposition of the spectral components, there is a pulse distribution that is virtually identical to the pulse distribution at the laser output.

Figure 9:
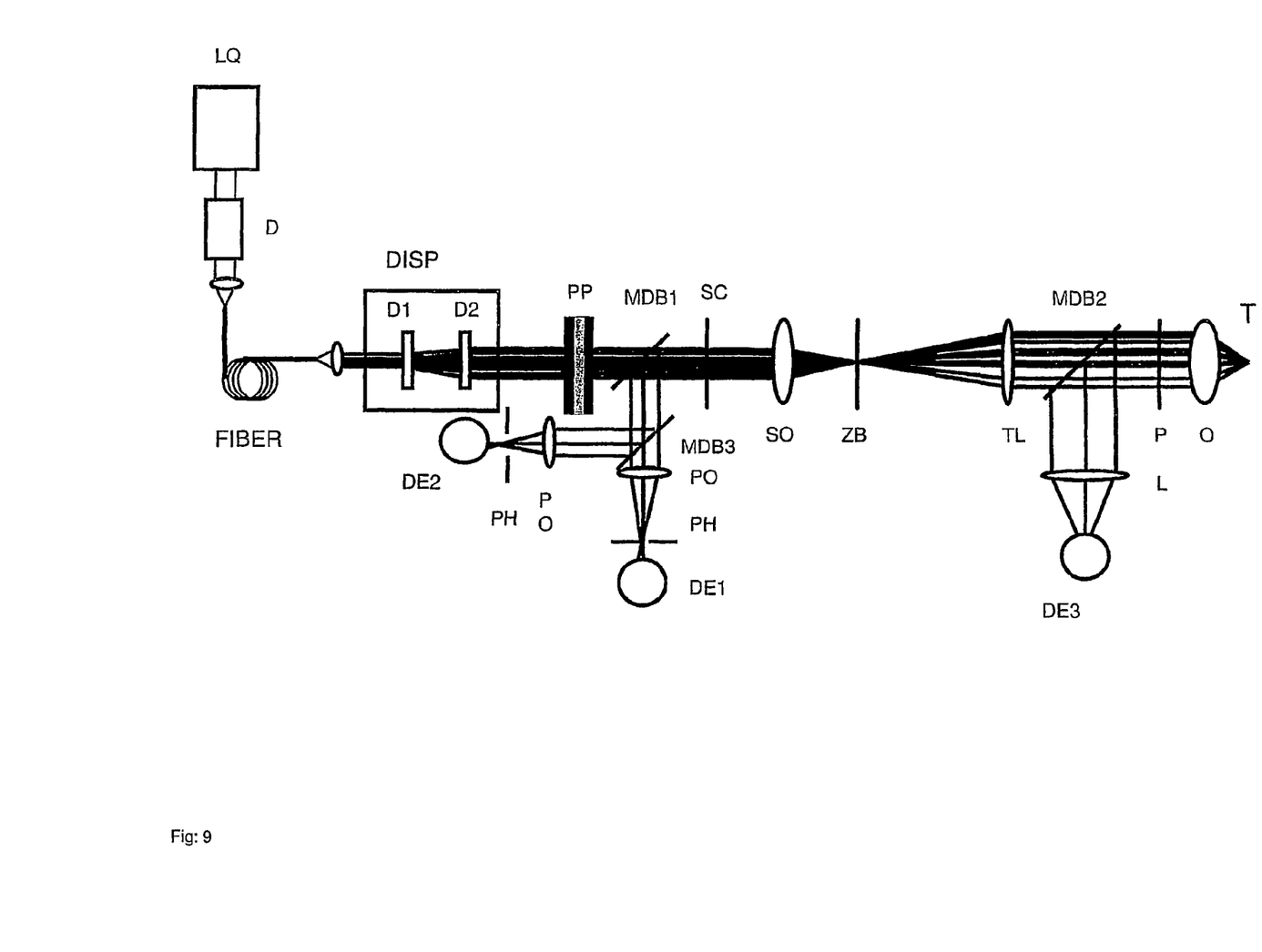
FIG. 9 illustrates an arrangement of the invention in schematic form in a laser scanning microscope.

Another arrangement in a laser scanning microscope is shown schematically in FIG. 9. It is substantially identical to the arrangement according to FIG. 2. However, a single-mode glass fiber (FIBER) with two optics for coupling into the glass fiber and an additional dispersive element D are provided between the light source LQ and the first dispersive element D1. In the simplest case, the dispersive element can be a block with a highly dispersive glass material or crystal such as TeO2. In this case, however, corresponding compensation of the total dispersion GVD of the optical arrangement between the light source LQ and the sample T must be provided, e.g., at point PP. The dispersive unit D can also be constructed so as to be adjustable according to DE 19744302A1, DE19930532A1. The phase plate or flexible unit at point PP can be dispensed with in this case because the unit D can carry out all compensation of GVD. It is advantageous in the arrangements according to FIG. 9 that the GVD added by the elements D1 and D2 can be used in a corresponding manner to compensate for the self-phase modulation SPM which can occur at high intensities in the glass fiber. In the present arrangement, it is especially advantageous that the dispersion caused by elements D1 and D2 can be selected so as to be substantially higher. In this way, the average output that can be coupled through the glass fibers and therefore the peak intensity that can be achieved at the location of the sample T are increased. Reference is had to DE19827139A1 for a description of the interplay of the effects of D, FIBER and D1/D2.

Figure 10:
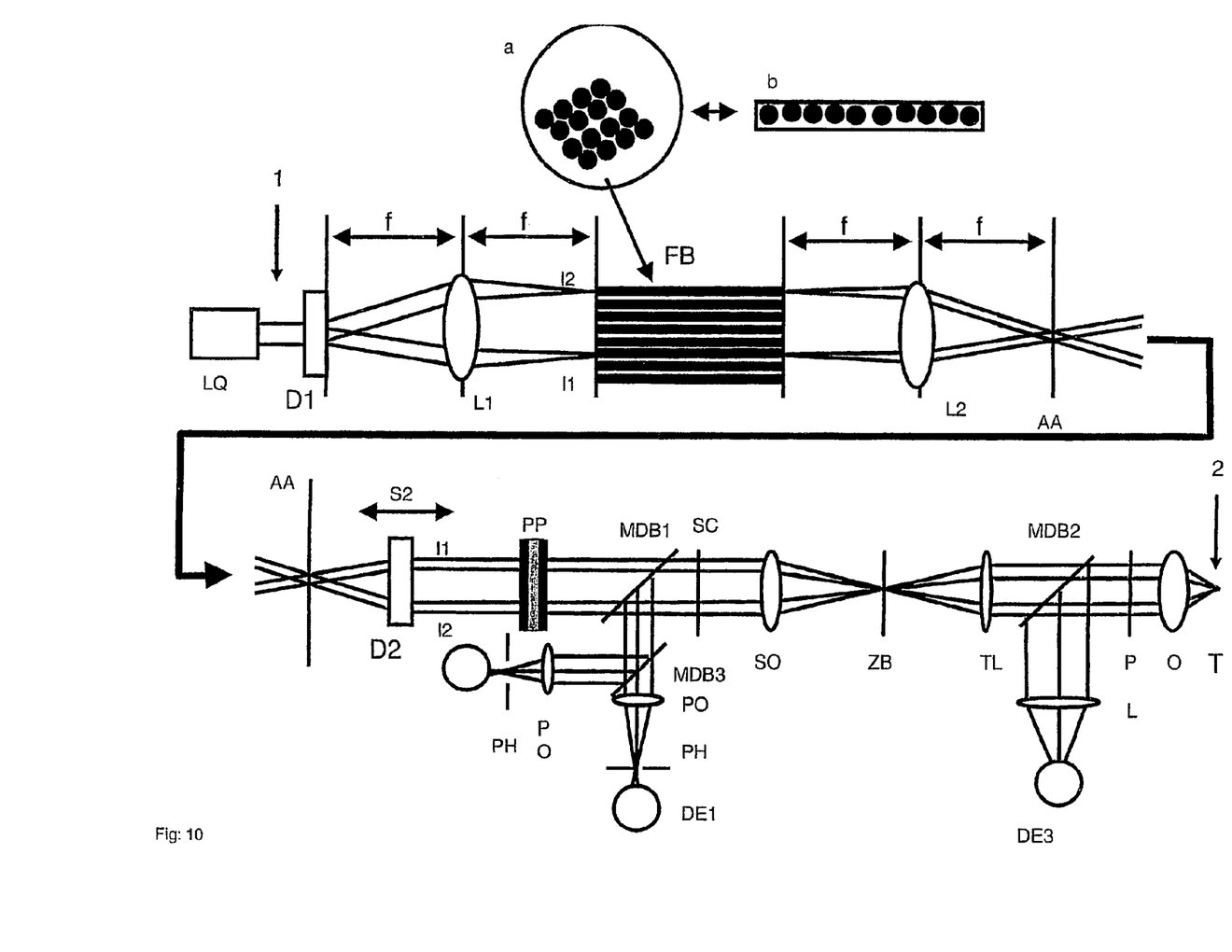
FIG. 10 illustrates, in schematic form, another construction of a laser scanning microscope with a glass fiber.

FIG. 10 shows another construction of a laser scanning microscope with a glass fiber. In contrast to FIG. 9, a glass fiber bundle FB is located between elements D1 and D2. The light is coupled into and out of the glass fibers by means of two lenses L1 and L2. The glass fibers are located at one focal point of the lenses L1 and L2 and the dispersive elements D1 and D2 are located at the remaining focal points. The focal lengths of the lenses need not be identical. However, when the selected focal lengths are not identical, the grating D2 must be adapted in a corresponding manner. The geometry of the fiber bundle results from the choice of dispersive elements D1 and D2. For example, when using an element corresponding to FIG. 3, the fiber bundle must have a circular cross section corresponding to 10a. When using elements corresponding to FIGS. 4 to 6, the individual fibers must be arranged in the fiber bundle in a row. Fiber bundles are shown schematically in FIGS. 10a, 10b, wherein individual fibers are shown by way of example in black. Microlenses can also be arranged in front of the individual fibers for a more efficient coupling into the fibers.

Due to the effect of D1, only certain spectral regions are coupled into every fiber, so that the fiber sees no pulses or only very long pulses and therefore only low pulse peak outputs and pulse peak intensities, which could otherwise lead to damaging effects particularly in the glass fibers. Therefore, substantially higher average outputs can be delivered through the fibers without changing the pulse shape.

The spectral components that are coupled out of the glass fiber bundle are collimated by L2, wherein the individual spectral components intersect as parallel bundles. The remaining angular dispersion is canceled again by D2, wherein the spectral components remain spatially separate. The subsequent optics correspond to the components that were already described with reference to FIG. 2. By means of the displacement S2 along the optical axis, the illumination of the optics focusing in the sample can again be adapted.

Compensation of the differences in transit time of the individual spectral components and of the group velocity dispersion GVD of the light pulses is carried out by means of PP, preferably with a flexible unit (SLM) with controllable elements in a line-shaped or matrix-shaped arrangement.

The above-described arrangement of a glass fiber bundle results in a novel advantageous arrangement with a module comprising the light source, the spectral splitter D1 and means for coupling into the fibers and, behind the fiber bundle, the microscope module with the second dispersive element D2, which modules are decoupled from one another in this way and can be arranged so as to be individually exchangeable.

While the foregoing description and drawings represent the present invention, it will be obvious to those skilled in the art that various changes may be made therein without departing from the true spirit and scope of the present invention.

What is claimed is:

1. A method for the optical examination and/or processing of a sample, comprising the steps of:
    generating a short-pulse illumination light;
    splitting the illumination light spectrally for generating spatially separated spectral components with pulse lengths that are greater than the pulse length of the illumination light source;
    said spectral components traversing transmission optics in the direction of the sample;
    focusing the illumination light on or in the sample, wherein the spectral components are superposed; and
    detecting the sample light;
    wherein the spatially separated spectral components are changed into a parallel beam bundle.

2. The method according to claim 1,
    wherein the pulse length of the spectral components focused on or in the sample is smaller than the pulse length of the spatially separated spectral components.

3. An arrangement for the optical examination and/or processing of a sample, comprising:
    means for generating an illumination light;
    means arranged downstream of the latter for spectral splitting of the illumination light for generating spatially separated spectral components with pulse lengths that are greater than the pulse length of the illumination light source;
    means for parallelizing the split illumination light;
    means for focusing the illumination light on or in the sample, wherein the spectral components are superposed; and
    means for detecting the sample light;
    wherein means are provided for changing the spatially separated spectral components into a parallel beam bundle.

4. The arrangement according to claim 3,
    wherein the pulse length of the spectral components that are focused on or in the sample is smaller than the pulse length of the spatially separated spectral components.

5. The arrangement according to claim 3,
    wherein dispersion means are provided between the light source and the means for spectral splitting.

6. The arrangement according to claim 3,
    wherein the parallel beam bundle is coupled into and out of a glass fiber bundle.

7. The arrangement according to claim 3,
    wherein the spectral splitting is carried out by at least one prism and/or axicon and/or transmission grating and/or reflection grating.

8. The arrangement according to claim 3,
    wherein the change into a parallel beam bundle is carried out by another prism or another axicon or another grating.

9. The arrangement according to claim 8,
    wherein a first prism and a second prism or first axicon and second axicon are constructed in such a way that, together, they act like a plane plate.

10. The arrangement according to claim 3,
wherein a direct-vision prism is provided for splitting and parallelizing.

11. The arrangement according to claim 10,
wherein a direct-vision prism is provided for splitting and parallelizing.

12. The arrangement according to claim 3,
wherein a compensating element is provided in the parallel beam path for influencing the components.

13. The arrangement according to claim 12,
wherein the components are influenced in an adjustable manner by exchangeable optical elements with different cross-sectional shapes and/or by a spatial light modulator.

14. A method of using the arrangement according to claim 3 comprising the step of using it in a fluorescence microscope.

15. A method of using the arrangement according to claim 3 comprising the step of using it in a multiphoton microscope.

16. A method of using an arrangement according to claim 3 comprising the step of using it in a laser scanning microscope.

17. A method of using an arrangement according to claim 3 comprising the step of using it in a nonlinear laser scanning microscopy.

18. A method of using an arrangement according to claim 3 comprising the step of using it in materials processing.

19. A method of using an arrangement according to claim 3 in the treatment of biological tissue.

20. A method of using an arrangement according to claim 3 in the treatment of the cornea of the eye.

21. An arrangement for the optical examination and/or processing of a sample, comprising:
means for generating a short-pulse illumination light;
means arranged downstream of the latter for spectral splitting of the illumination light for generating spatially separated spectral components with pulse lengths that are greater than the pulse length of the illumination light;
transmission optics for transmitting the spectral components in the direction of the sample;
means for focusing the illumination light on or in the sample, wherein the spectral components are superposed; and
means for detecting the sample light;
wherein means are provided for changing the spatially separated spectral components into a parallel beam bundle.

22. The arrangement according to claim 21, wherein the pulse length of the spectral components that are focused on or in the sample is smaller than the pulse length of the spatially separated spectral components.

23. The arrangement according to claim 21,
wherein dispersion means are provided between the light source and the means for spectral splitting.

24. The arrangement according to claim 21,
wherein the parallel beam bundle is coupled into and out of a glass fiber bundle.

25. The arrangement according to claim 21,
wherein the spectral splitting is carried out by at least one prism and/or axicon and/or transmission grating and/or reflection grating.

26. The arrangement according to claim 21,
wherein the change into a parallel beam bundle is carried out by another prism or another axicon or another grating.

27. The arrangement according to claim 26,
wherein a first prism and a second prism or first axicon and second axicon are constructed in such a way that, together, they act like a plane plate.

28. The arrangement according to claim 21,
wherein a compensating element is provided in the parallel beam path for influencing the components.

29. The arrangement according to claim 28,
wherein the components are influenced in an adjustable manner by exchangeable optical elements with different cross-sectional shapes and/or by a spatial light modulator.

30. A method of using the arrangement according to claim 21 comprising the step of using it in a fluorescence microscope.

31. A method of using the arrangement according to claim 21 comprising the step of using it in a multiphoton microscope.

32. A method of using an arrangement according to claim 21 comprising the step of using it in a laser scanning microscope.

33. A method of using an arrangement according to claim 21 comprising the step of using it in a nonlinear laser scanning microscopy.

34. A method of using an arrangement according to claim 21 comprising the step of using it in materials processing.

35. A method of using an arrangement according to claim 21 in the treatment of biological tissue.

36. A method of using an arrangement according to claim 21 in the treatment of the cornea of the eye.

* * * * *